(12) United States Patent
Lind et al.

(10) Patent No.: US 8,364,963 B2
(45) Date of Patent: Jan. 29, 2013

(54) METHOD AND DEVICE FOR BLUETOOTH PAIRING

(75) Inventors: Patric Lind, Lund (SE); Erwin Weinans, Klijndijk (NL)

(73) Assignee: Sony Ericsson Mobile Communications, AB, Lund (SE)

( * ) Notice: Subject to any disclaimer, the term of this patent is extended or adjusted under 35 U.S.C. 154(b) by 1162 days.

(21) Appl. No.: 11/568,821

(22) PCT Filed: May 9, 2005

(86) PCT No.: PCT/EP2005/052088
§ 371 (c)(1), (2), (4) Date: Jul. 20, 2007

(87) PCT Pub. No.: WO2005/109781
PCT Pub. Date: Nov. 17, 2005

(65) Prior Publication Data
US 2008/0013601 A1    Jan. 17, 2008

Related U.S. Application Data

(60) Provisional application No. 60/570,630, filed on May 13, 2004.

(30) Foreign Application Priority Data

May 10, 2004   (EP) .................................... 04102009

(51) Int. Cl.
  *G06F 21/00*   (2006.01)
(52) U.S. Cl. ........ 713/171; 709/203; 455/411; 455/435; 370/350; 380/270
(58) Field of Classification Search .................... 713/171
  See application file for complete search history.

(56) References Cited

U.S. PATENT DOCUMENTS

| 4,200,770 | A | 4/1980 | Hellman et al. | |
|---|---|---|---|---|
| 6,766,160 | B1 * | 7/2004 | Lemilainen et al. | .......... 455/411 |
| 6,990,354 | B2 | 1/2006 | Kantola et al. | |

(Continued)

FOREIGN PATENT DOCUMENTS

| EP | 1 416 677 A | 5/2004 |
|---|---|---|
| JP | 2002-009695 | 1/2002 |

(Continued)

OTHER PUBLICATIONS

Japanese Office Action (4 pages) corresponding to Japanese Patent Application No. 2007-512205; Mailing Date: Jun. 16, 2010.

*Primary Examiner* — Taghi Arani
*Assistant Examiner* — Mahfuzur Rahman
(74) *Attorney, Agent, or Firm* — Myers Bigel Sibley & Sajovec, P.A.

(57) ABSTRACT

Methods are provided for automatic pairing of a first electronic device and a second electronic device in a radio communications system. Such methods can include bringing the first and second electronic devices in proximity to each other and transmitting an inquiry signal from the second electronic device. Such methods can also include transmitting an inquiry response signal from the first electronic device to the second electronic device, upon detecting the inquiry signal and establishing, in the second electronic device, a High Level Authentication connection with the first electronic device, based on the first electronic device being the first device to respond to the inquiry signal. Such methods can further include transmitting a private key from the second electronic device to the first electronic device, creating a common unique passkey, and initiating a pairing, by the first electronic device, using the unique passkey.

10 Claims, 2 Drawing Sheets

U.S. PATENT DOCUMENTS

| | | | |
|---|---|---|---|
| 6,993,323 B2 * | 1/2006 | Kamma | 455/411 |
| 7,668,127 B2 * | 2/2010 | Krishnamurthy et al. | 370/311 |
| 2001/0016909 A1 * | 8/2001 | Gehrmann | 713/171 |
| 2002/0003481 A1 * | 1/2002 | Kantola et al. | 340/825.77 |
| 2002/0176445 A1 * | 11/2002 | Melpignano | 370/480 |
| 2003/0050009 A1 * | 3/2003 | Kurisko et al. | 455/41 |
| 2003/0220765 A1 * | 11/2003 | Overy et al. | 702/158 |
| 2004/0072580 A1 | 4/2004 | Honda et al. | |
| 2004/0128509 A1 * | 7/2004 | Gehrmann | 713/171 |
| 2005/0021940 A1 * | 1/2005 | Ma | 713/155 |
| 2005/0027910 A1 * | 2/2005 | Barrett et al. | 710/62 |
| 2005/0027918 A1 * | 2/2005 | Govindarajulu et al. | 710/313 |
| 2007/0264976 A1 * | 11/2007 | Lessing et al. | 455/414.1 |
| 2008/0077185 A1 * | 3/2008 | Pearce et al. | 607/5 |
| 2009/0143141 A1 * | 6/2009 | Wells et al. | 463/37 |
| 2011/0208259 A1 * | 8/2011 | Pearce et al. | 607/5 |

FOREIGN PATENT DOCUMENTS

| | | |
|---|---|---|
| JP | 2003-179594 A | 6/2003 |
| JP | 2004-096306 | 3/2004 |
| WO | WO 00/51293 A | 8/2000 |
| WO | WO 02073874 A2 * | 9/2002 |
| WO | WO 2004/038998 | 5/2004 |

* cited by examiner

METHOD AND DEVICE FOR BLUETOOTH PAIRING

RELATED APPLICATIONS

The present application is a 35 U.S.C. §371 national phase application of PCT International Application No. PCT/EP2005/052088, having an international filing date of May 9, 2005 and claiming priority to European Patent Application No. 04102009.0, filed May 10, 2004 and U.S. Provisional Application No. 60/570,630 filed May 13, 2004, the disclosures of which are incorporated herein by reference in their entireties. The above PCT International Application was published in the English language and has International Publication No. WO 2005/109781 A1.

FIELD OF THE INVENTION

The present invention relates to a method and device for pairing of electronic Bluetooth devices, and particularly for pairing a device with an accessory to the device, e.g. a mobile phone with a headset. More specifically, the invention relates to a method for automatic pairing with a high level of security.

STATE OF THE ART

Systems and protocols for communication between electronic devices have been provided in many different forms through the years. In recent years, an attempt has been made to standardise a system for short range radio communication between electronic devices, under the name Bluetooth. Bluetooth is basically a wireless personal area network technology, which is an open standard for short-range transmission of digital voice and data between predominantly mobile devices, such as laptops, Personal Digital Assistants PDA, and mobile phones, but also between mobile devices and stationary devices, and between stationary devices, such as printers, computers, fax machines and so on. Bluetooth supports point-to-point and multipoint applications. Bluetooth typically provides up to 720 Kbps data transfer within a range of 10 meters and up to 100 meters with a power boost. Bluetooth uses omni-directional radio waves that can transmit through walls and other non-metal barriers in the unlicensed 2.4 GHz band.

To use Bluetooth communication between two devices, the two devices need to first establish a trusted relationship. This is done through the Bluetooth pairing, sometimes referred to as bonding, process. During pairing, one and the same passkey is entered in both devices. For the example of using a wireless headset with a mobile phone, the user has first to pair the two device together to ensure that GSM subscription is protected and integrity for voice calls is kept. Since Bluetooth has normally at least 10 m range, the user need to confirm that connections are to be established in order to ensure that it is the right devices that get connected. Some Bluetooth devices, like headsets, have no user interface so they use a fixed passkey. To simplify logistics, the value of this is sometimes the same in all samples, e.g. "0000" in all Sony Ericsson headsets.

In a typical state of the art solution for pairing a headset with a mobile phone, the pairing process involves the steps of:
  making headset discoverable and pairable, e.g. by simply by powering on the headset;
  initiating a pairing procedure from the phone;
  selecting a headset to pair with from a list of such devices that were discovered as a result of starting the pairing procedure;
  entering a passkey that corresponds to the headset to pair with, e.g. a standard passkey for these types of devices.

A problem with the current solution is that many users find it highly non-intuitive and cumbersome to perform all the necessary steps which include decisions that users may not be accustomed to. And if some problem occurs in one of the steps, it is difficult to correct it. Furthermore, using the same, un-changeable, passkey for all devices of a certain type, such as hands-free headsets, is considered to imply a reduced security level.

SUMMARY OF THE INVENTION

The object of the invention is to simplify the procedure of pairing a device and an accessory. An aspect of this object is to provide a simplified solution for pairing, which has a high level of security.

According to a first aspect, this object is fulfilled by a method of pairing a first electronic device and a second electronic device in a radio communications system, comprising the steps of:
  bringing the first and second electronic devices in proximity to each other;
  transmitting an inquiry signal from said second electronic device;
  transmitting an inquiry response signal from said first electronic device, upon detecting said inquiry signal;
  initiating point-to-point connection between said first electronic device and said second electronic device, based on said first electronic device being the first device to respond to said inquiry signal.

Preferably, said inquiry signal has an output power restricted to a first power level, which first power level is lower than a standard signal power level in said radio communications system.

In one embodiment, said first power level represents a maximum distance within which said inquiry signal is detectable, said proximity being at most said maximum distance.

In another embodiment, said inquiry signal has an output power which increases with time.

In a different embodiment, said second device has a detection sensitivity to said inquiry response signal which increases with time.

Preferably, said method comprises, after said step of bringing the first and second electronic devices in proximity to each other, the steps of:
  turning on communication capability in said first electronic device;
  turning on communication capability in said second electronic device.

In one embodiment said step of initiating point-to-point connection comprises the step of:
  said second electronic device establishing an authentication connection with said first electronic device.

In one embodiment, said step of establishing an authentication connection comprises the steps of:
  said second electronic device requesting said first electronic device to start pairing after establishing said authentication connection.

Preferably, said step of establishing an authentication connection comprises the steps of:
  retrieving a private key from a memory; and
  transmitting said private key to said first electronic device.

In one embodiment, the method further comprises the step of:
  said first electronic device verifying that said second electronic device is a trusted device, using said private key.

Preferably, the method further comprises the steps of:
using a high level authentication protocol to create a common unique passkey; and
said first electronic device initiating pairing using said passkey.

In one embodiment, said first power level is −50 dBm or lower.

Preferably, the method comprises the step of:
interrupting transmission of said inquiry signal upon receiving a first inquiry response signal.

In a preferred embodiment, said radio communications system is Bluetooth.

In one embodiment, first electronic device is a mobile phone.

In one embodiment, said second electronic device is a wireless hands-free device.

According to a second aspect, the stated object is fulfilled by a mechanism for pairing an electronic device with other devices in a radio communications system, wherein said electronic device comprises a signal transmitter for transmitting an inquiry signal, and a receiver for receiving an inquiry response signal, wherein said electronic device comprises means for initiating point-to-point connection with an other device, based on said other device being the first device to respond to said inquiry signal.

In one embodiment, said signal transmitter comprises means for transmitting said inquiry signal with an output power restricted to a first power level, which first power level is lower than a standard signal power level in said radio communications system.

In one embodiment, said first power level represents a maximum distance within which said inquiry signal is detectable, said proximity being at most said maximum distance.

In one embodiment, said signal transmitter comprises means for transmitting said inquiry signal with an output power which increases with time.

In one embodiment, said signal receiver has a detection sensitivity to said inquiry response signal which increases with time.

Preferably, said signal transmitter is devised to begin transmission of said inquiry signal upon turning on communication capability of said electronic device.

In one embodiment, said electronic device comprises means for establishing an authentication connection with other electronic device.

Preferably, said electronic device comprises means for requesting said other electronic device to start pairing after establishing said authentication connection.

In one embodiment, said electronic device comprises a data memory storing a private key for said electronic device, means for retrieving said private key from said memory, and means for transmitting said private key to said other electronic device.

In one embodiment, authentication means are included, devised to create a common unique pairing passkey, using a high level authentication protocol to.

Preferably, said first power level is −50 dBm or lower.

In a preferred embodiment, said electronic device comprises means for interrupting transmission of said inquiry signal upon receiving a first inquiry response signal.

In one embodiment, said radio communications system is Bluetooth.

In one embodiment, said electronic device is a headset.

In one embodiment, said other electronic device is a mobile phone.

BRIEF DESCRIPTION OF THE DRAWINGS

The invention will be described in detail below with reference to the accompanying drawings, in which.

DETAILED DESCRIPTION OF PREFERRED EMBODIMENTS

The present description relates to the field of electronic devices which are capable of being interconnected by means of direct short range radio communication, such as by means of Bluetooth. Such devices include all mobile radio terminals devised for radio communication with a radio station, which radio station also may be mobile terminal or e.g. a stationary base station. Consequently, the term radio terminal includes mobile telephones, pagers, communicators, electronic organisers, smartphones, PDA:s (Personal Digital Assistants) and DECT terminals (Digital Enhanced Cordless Telephony). Electronic devices capable of making use of the present invention further includes stationary devices, such as desktop computers, fax machines, printers and so on, which are communicatively connectable to mobile equipment by means of direct short range radio communication. Furthermore, it should be emphasised that the term comprising or comprises, when used in this description and in the appended claims to indicate included features, elements or steps, is in no way to be interpreted as excluding the presence of other features elements or steps than those expressly stated.

Examples of embodiments will now be described with references made to the accompanying drawing. The invention will mainly be described with reference to a first electronic device in the form of a mobile telephone, and a second electronic device in the form of a passive accessory, such as a headset or a hands free kit. The devices should be provided with means for communicating by radio, such as a Bluetooth connection.

Figure 1:
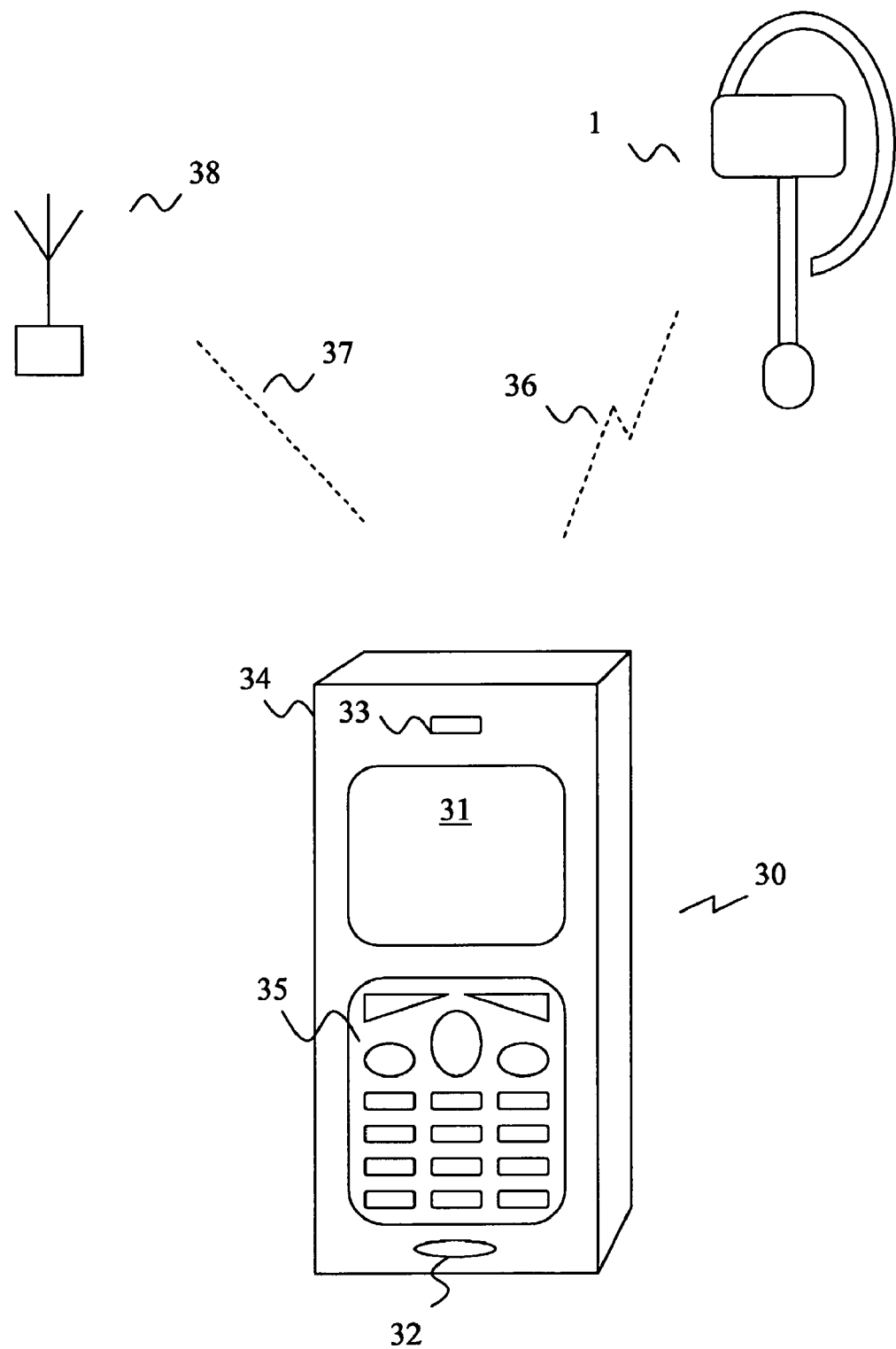
FIG. 1 is a schematic drawing of a mobile terminal and a headset communicating point-to point in a radio communications system.

FIG. 1 illustrates a typical arena for the present invention, wherein a headset 1 is useable for conveying audio data to and from a radio telephone 30 over a first type transmission link 36. The radio telephone 30, as such, communicates with base stations 38 of a mobile telephone system, over a second type transmission link. The communication terminal is disclosed in the embodiment of a cellular mobile phone 30 devised for radio communication. The terminal 30 comprises a chassis or housing 34, carrying a user audio input in the form of a microphone 32 and a user audio output in the form of a loudspeaker 33. A set of keys, buttons or the like constitutes a data input interface 35, and is usable e.g. for dialling, according to the established art. A data output interface comprising a display 31 is further included, devised to display communication information, address list etc in a manner well known to the skilled person. The radio communication terminal 30 includes radio transmission and reception electronics, and is devised with an antenna, such as a traditional stub antenna or a built-in low profile antenna device inside the housing 34, for communicating with a base station 38 by over an air interface, e.g. defined by NMT, PDC, CDMA, GSM or WCDMA. In the illustrated embodiment, the terminal 30 is fully operational without the headset 1, by carrying its own audio interface 32,33. In an alternative embodiment, the terminal may lack either speaker 33 or microphone 32, or both, only being useable for conveying audio signals by use of the headset 1.

The communication between the headset 1 and the terminal 30 is preferably achieved by a transmission interface which is different from that of the communication between the terminal 30 and the network base stations 38. More specifically, communication over transmission link 36 is preferably achieved over a short range radio, preferably Bluetooth.

Figure 2:
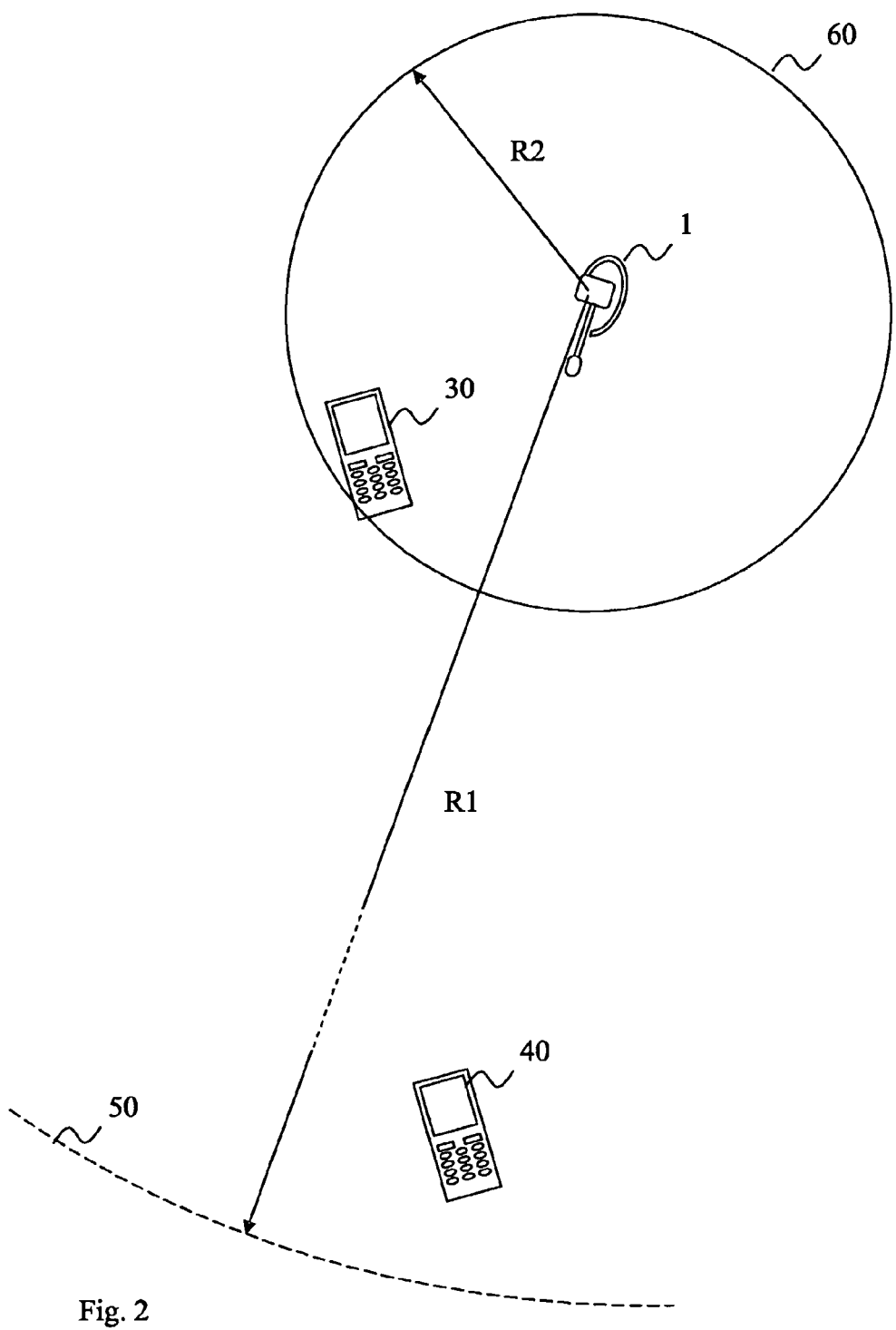
FIG. 2 schematically illustrates pairing of the electronic devices of FIG. 1, according to an embodiment of the invention.

FIG. 2 illustrates the process of automatic pairing of devices according to an embodiment of the invention. In the illustrated embodiment, a first electronic device is provided in the form of a mobile radio terminal 30, and a second electronic device is provided in the form of a cordless headset or hands-free device 1. Both terminal 30 and headset 1 are provided with Bluetooth transceiver means, and are thus devised for communicative connection. Bluetooth typically has a range of about 10 m, which means that there may well be several different Bluetooth devices within the coverage area of headset 1, which is one of the reasons why pairing is a crucial element in Bluetooth communication. In FIG. 2, the range R1 of headset 1 in normal Bluetooth communication defines a coverage area 50, a portion of which is indicated by the dashed line in FIG. 2. Within coverage area 50, terminal 30 is located, and also a second terminal 40. The invention brings about an advantage over prior art solutions by removing the need for a user to interact during the pairing procedure. Furthermore, a secure pairing procedure is provided, such that the correct devices are paired, in this case terminal 30 and headset 1. All the user needs to understand is that the two devices need to be in close range from each other when the Bluetooth function in at least one of the devices is turned on.

The process steps a user needs to take to pair terminal 30 to headset 1 can be described as follows, for the illustrated embodiment:

The user brings terminal 30 and headset 1 in close proximity to each other, e.g. by holding one in each hand;

The user turns the Bluetooth function on in the un-paired terminal 30, upon which the terminal is made discoverable and pairable. This step may be performed before the first step described above;

The user powers on the un-paired headset 1;

The terminal 30 and the headset 1 performs paring automatically and the user is notified about the successful outcome, e.g. through sound and text indications. Possibly, user confirmation using the terminal interface may be included.

The invention covers what happens during the third step above, starting with the headset being powered on.

In one embodiment, a key element is the usage of an extremely low output power, e.g. −50 dBm, when transmitting an inquiry signal from headset 1. The output power, in turn, reflects the range R2 of headset 1. In FIG. 2 the range R2 is illustrated by a circle, which defines a coverage area 60 for headset 1 when transmitting in a low power mode. The range R2, which is considerably smaller than the standard transmission range R1, may e.g. be 2 m, 1 m, 0.5 m or even smaller.

Upon transmitting the inquiry signal from headset 1, in the low power mode defining a range R2, any active Bluetooth device within coverage area 60 may generate and transmit a response signal. By using the low power mode as described, the probability for more than one device being located within coverage area 60 is very small. Needless to say, the lower the power, i.e. the smaller range R2, the lower the probability of receiving more than one inquiry response signal from other devices.

When headset 1 receives a first inquiry response signal, it aborts the inquiry process and start paging the sender of the response signal. In the illustrated embodiment, terminal 30 is the only device within coverage area 60, and will therefore be the device sending the inquiry response signal. Once this inquiry response signal is detected by headset 1, transmission of the inquiry signal is interrupted. This way, headset 1 is devised to set up communication with the closest device.

In a more advanced embodiment, transmission of the inquiry signal is performed with an increasing output power, rendering a range R2(t) which is increasing with time. Starting from zero, or a very low original output power value, the output power is increased at a certain rate until either full output power, representing the full range R1, has been reached, or until a first inquiry response signal has been detected. This way, an even higher degree of certainty is achieved in finding and connecting with the closest Bluetooth device, terminal 30 in the illustrated example.

In yet another embodiment, an attenuation of the sensitivity to detection of inquiry response signals is used instead of a low output power. In such an embodiment, the inquiry signal is transmitted from headset 1 at full power, or at a predetermined lower power level, and the attenuation of an input signal sensor is set to only sense signals of a certain power, representing a certain range R2. Furthermore, also this embodiment may employ a time-depending function, such that the attenuation of the sensitivity to inquiry response signals is decreased at a certain rate, thereby increasing the sensitivity and the range R2.

When terminal 30 responds to the page, the headset 1 preferably establishes a High Level Authentication (HLA) connection to the terminal 30, e.g. by using some standard security protocol, or other type of protocol, on top of the Bluetooth L2CAP protocol. Examples of usable security protocols include "Entity authentication using public key cryptography", FIPS PUB 196; "Entity authentication using a cryptographic check function", ISO 9798-4; and TLS, "Transport Layer Security" protocol v. 1.0, RFC 2246.

On the HLA connection, headset 1 requests terminal 30 to start pairing.

Headset 1 preferably retrieves a private key from a memory, and transmits said private key to terminal 30.

Terminal 30 subsequently verifies that headset 1 is a trusted device by using a certificate and said private key.

By means of the high level authentication, the terminal 30 and the headset 1 creates a common and unique passkey, preferably comprising 16 unpredictable characters.

Terminal 30 thereby initiates pairing using the newly derived passkey.

The invention removes three cumbersome user interactions steps from the pairing process, in that:

I. The user no longer needs to start the pairing process manually. In the preferred embodiment, automatic pairing is performed upon power on of at least one of the devices to be paired. Typically, an accessory to be paired with an electronic device will be turned on when it is held in proximity to the device. One example is a headset used as an accessory to an electronic device in the form of a mobile phone. Another example is a mouse used as an accessory to an electronic device in the form of a computer. The electronic device may on the other hand be powered on already.

II. The user no longer needs to select a device in a list of located devices, since the closest one is automatically located and selected to be the pairing partner.

III. The user no longer needs to enter a passkey manually, since key transmission is performed automatically between the pairing devices.

All together, the invention makes the pairing process a lot simpler than prior art solutions, and therefore more attractive to average non-technical consumers. Furthermore, compared to the current solution where a commonly known passkey is used by all headsets, the use of a unique and long passkey increases the security level considerably.

The foregoing has described the principles, preferred embodiments and modes of operation of the present invention. However, the invention should be regarded as illustrative rather than restrictive, and not as being limited to the particular embodiments discussed above. For one thing, it should be appreciated that the relation between output power and range cannot be represented by an absolute number, rather it is dependent on other factors such as how well shielded one or both devices are from each other. It should therefore be appreciated that variations may be made in the disclosed embodiments by persons skilled in the art without departing from the scope of the present invention as defined by the following claims.

The invention claimed is:

1. A method for automatic pairing of a first electronic device and a second electronic device, comprising:
   bringing the first and second electronic devices in proximity to each other; and automatically executing a sequence comprising:
   a. transmitting an inquiry signal from the second electronic device wherein the inquiry signal comprises an output power restricted to a first power level, wherein the first power level is lower than a standard power level used in pairing according to the Bluetooth technology standard and corresponds to a maximum distance within which the inquiry signal is detectable, wherein the proximity, does not exceed the maximum distance;
   b. transmitting an inquiry response signal from the first electronic device to the second electronic device, upon detecting the inquiry signal;
   c. interrupting transmission of the inquiry signal upon receiving the inquiry response signal from the first electronic device at the second electronic device;
   d. establishing, in the second electronic device, a High Level Authentication connection with the first electronic device, based on the first electronic device being first to respond to the inquiry signal;
   e. creating a common unique passkey using the High Level Authentication connection; and
   f. initiating a pairing according to a Bluetooth technology standard, by the first electronic device, using the unique passkey.

2. The method as recited in claim 1, wherein the inquiry signal comprises an output power which increases with time.

3. The method as recited in claim 1, wherein the second electronic device comprises a detection sensitivity to the inquiry response signal which increases with time.

4. The method as recited in claim 1, further comprising turning on communication capability in the second electronic device after bringing the first and second electronic devices in proximity to each other.

5. The method as recited in claim 1, wherein establishing a High Level Authentication connection comprises requesting, from the second electronic device to the first electronic device, to start pairing after establishing the authentication connection.

6. The method as recited in claim 1, wherein the first electronic device comprises a mobile phone.

7. The method as recited in claim 6, wherein the second electronic device comprises a wireless hands-free device.

8. The method as recited in claim 1, wherein the first electronic device comprises a computer and the second electronic device comprises a mouse.

9. The method as recited in claim 1, comprising initiating transmission of the inquiry signal from the second electronic device responsive to powering on the second electronic device.

10. A method for automatic pairing of a first electronic device and a second electronic device, comprising;
   bringing the first and second electronic devices in proximity to each other; and automaticity executing a sequence comprising:
   a. transmitting an inquiry signal from the second electronic device wherein the inquiry signal comprises an output power restricted to a first power level, wherein the first power level is −50 dBm or lower;
   b. transmitting an inquiry response signal from the first electronic device to the second electronic device, upon detecting the inquiry signal;
   c. interrupting transmission of the inquiry signal upon receiving the inquiry response, signal from the first electronic device at the second electronic device;
   d. establishing, in the second electronic device, a High Level Authentication connection with the first electronic device, based on the first electronic device being first to respond to the inquiry signal;
   e. creating a common unique passkey using the High Level Authentication connection; and
   f. initiating a pairing according to a Bluetooth technology standard, by the first electronic device, using the common unique passkey.

* * * * *

UNITED STATES PATENT AND TRADEMARK OFFICE
CERTIFICATE OF CORRECTION

| | |
|---|---|
| PATENT NO. | : 8,364,963 B2 |
| APPLICATION NO. | : 11/568821 |
| DATED | : January 29, 2013 |
| INVENTOR(S) | : Lind et al. |

It is certified that error appears in the above-identified patent and that said Letters Patent is hereby corrected as shown below:

In the Claims:
Column 7, Claim 1, Line 44: Please correct "using the unique"
to read -- using the common unique --

Column 8, Claim 10, Line 36: Please correct "inquiry response, signal from the"
to read -- inquiry response signal from the --

Signed and Sealed this
Fourteenth Day of May, 2013

Teresa Stanek Rea
*Acting Director of the United States Patent and Trademark Office*